US009042896B2

(12) United States Patent
Jung et al.

(10) Patent No.: US 9,042,896 B2
(45) Date of Patent: May 26, 2015

(54) METHOD AND APPARATUS FOR EFFICIENT ZONE SWITCH OPERATION IN A BROADBAND WIRELESS ACCESS SYSTEM (75) Inventors: Inuk Jung, Anyang-si (KR); Jinsam Kwak, Anyang-si (KR); Kiseon Ryu, Anyang-si (KR); Wookbong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 13/822,919

(22) PCT Filed: Sep. 14, 2011

(86) PCT No.: PCT/KR2011/006763
§ 371 (c)(1),
(2), (4) Date: Mar. 13, 2013

(87) PCT Pub. No.: WO2012/036451
PCT Pub. Date: Mar. 22, 2012

(65) Prior Publication Data
US 2013/0178215 A1 Jul. 11, 2013

Related U.S. Application Data (60) Provisional application No. 61/382,889, filed on Sep. 14, 2010, provisional application No. 61/382,929, filed on Sep. 15, 2010, provisional application No. 61/393,952, filed on Oct. 18, 2010.

(30) Foreign Application Priority Data

Apr. 7, 2011 (KR) ........................ 10-2011-0032174

(51) Int. Cl.
*H04W 36/00* (2009.01)
*H04W 88/10* (2009.01)

(52) U.S. Cl.
CPC .......... *H04W 36/00* (2013.01); *H04W 36/0083* (2013.01); *H04W 36/0077* (2013.01); *H04W 88/10* (2013.01)

(58) Field of Classification Search
None
See application file for complete search history.

(56) References Cited

U.S. PATENT DOCUMENTS

| 2006/0079235 | A1 | 4/2006 | Kim |
| 2010/0069073 | A1* | 3/2010 | Chen et al. ..................... 455/437 |
| 2010/0098025 | A1* | 4/2010 | Chen et al. ..................... 370/331 |
| 2010/0172325 | A1 | 7/2010 | Jung et al. |
| 2011/0058511 | A1* | 3/2011 | Kim et al. ..................... 370/312 |

* cited by examiner

FOREIGN PATENT DOCUMENTS

| KR | 1020100097625 | 9/2010 |
| WO | 2009120031 | 10/2009 |

OTHER PUBLICATIONS

PCT International Application No. PCT/KR2011/006763, Notification of Transmittal of the International Search Report and the Written Opinion of the International Searching Authority, or Declaration dated Apr. 16, 2012, 9 pages.

*Primary Examiner* — Charles Appiah
*Assistant Examiner* — Margaret G Mastrodonato
(74) *Attorney, Agent, or Firm* — Lee, Hong, Degerman, Kang & Waimey (57) ABSTRACT A wireless access system and, more particularly, a method and apparatus for more efficiently performing zone switch are disclosed. The method of performing zone switch by an advanced mobile station (AMS) in a mixed-mode advanced base station (ABS) which operates in a mixed mode of a broadband wireless access system includes receiving a ranging response (RNG-RSP) message including system information of an AMS support zone from a legacy zone (LZone) of the ABS, and performing ranging to the AMS support zone using the system information.

8 Claims, 4 Drawing Sheets

METHOD AND APPARATUS FOR EFFICIENT ZONE SWITCH OPERATION IN A BROADBAND WIRELESS ACCESS SYSTEM

CROSS-REFERENCE TO RELATED APPLICATIONS

This application is the National Stage filing under 35 U.S.C. 371 of International Application No. PCT/KR2011/006763, filed on Sep. 14, 2011, which claims the benefit of earlier filing date and right of priority to Korean Patent Application No. 10- 2011-0032174, filed on Apr. 7, 2011, and also claims the benefit of U.S. Provisional Application Ser. No. 61/382,889, filed on Sep. 14, 2010, U.S. Provisional Application Ser. No. 61/382,929, filed on Sep. 15, 2010, and U.S. Provisional Application Ser. No. 61/393,952, filed on Oct. 18, 2010, the contents of which are all hereby incorporated by reference herein in their entirety.

TECHNICAL FIELD

The present invention relates to a wireless access system, and more particularly, to a method and apparatus for efficiently performing zone switch operation.

BACKGROUND ART

Handover (HO) indicates that a mobile station (MS) moves from an air interface of one base station to an air interface of another base station. Hereinafter, a handover procedure of a general IEEE 802.16e system will be described.

In an IEEE 802.16e network, a serving base station (SBS) may broadcast neighboring base station information through a neighboring advertisement (MOB_NBR-ADV) message in order to inform a mobile station (MS) of information (topology) about a basic network configuration.

The MOB_NBR-ADV message includes system information of a serving base station and neighboring base stations, for example, preamble indexes, frequencies, HO optimization degrees, downlink channel descriptor (DCD)/uplink channel descriptor (UCD) information, etc.

DCD/UCD information includes information necessary to enable an MS to perform information exchange in downlink and uplink. For example, DCD/UCD information includes HO trigger information, information about a medium access control (MAC) version of a base station, media independent handover capability information, etc.

A general MOB_NBR-ADV message includes only information about neighboring base stations of an IEEE 802.16e type. Information about base stations of the type other than an IEEE 802.16e type may be broadcast to MSs through a service identity information advertisement (SII-ADV) message. Accordingly, an MS may request an SBS to transmit the SII-ADV message so as to acquire information about base stations of a heterogeneous network.

A procedure for performing handover by an MS, which acquires information about neighboring base stations using the above-described method, in an IEEE 802.16e network will be described in greater detail with reference to FIG. 1.

Figure 1:
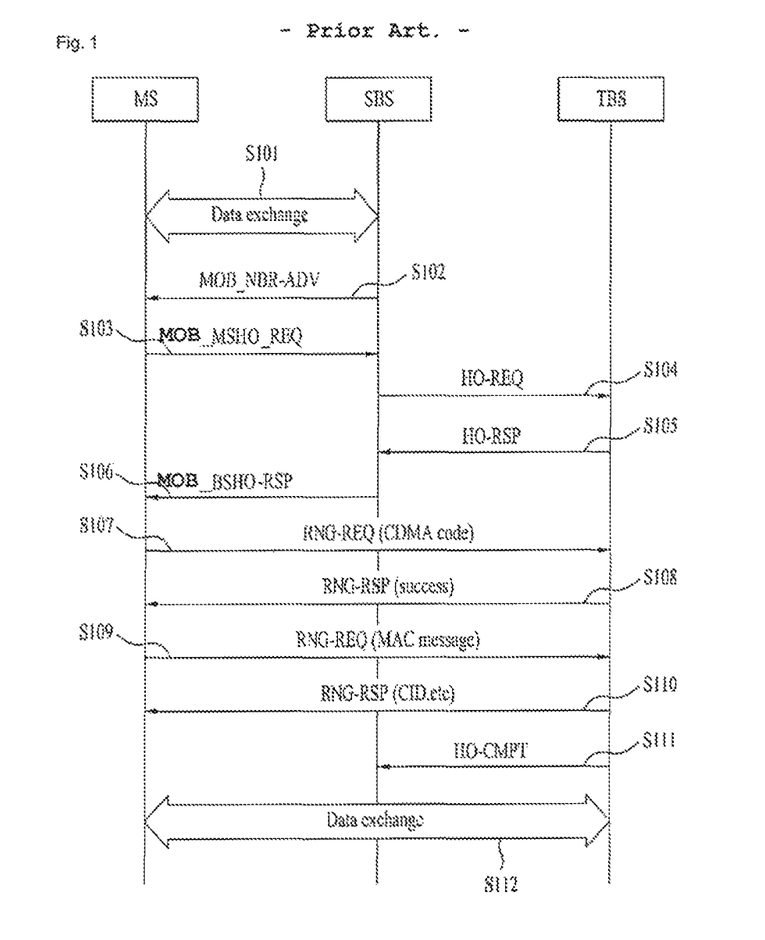
FIG. 1 is a diagram showing an example of a handover procedure which may be performed in the IEEE 802.16e system.

FIG. 1 is a diagram showing an example of a handover procedure which may be performed in a general IEEE 802.16e system.

Referring to FIG. 1, first, a mobile station (MS) may access a serving base station (SBS) so as to perform data exchange (S101).

The SBS may periodically broadcast information about neighboring base stations (BSs) located within a coverage area thereof to the MS through an MOB_NBR-ADV message (S102).

The MS may begin to scan candidate HO BSs using an HO trigger condition while communicating with the SBS. The MS may transmit a handover request (MOB_MSHO-REQ) message so as to request the SBS to perform a handover procedure if a handover condition exceeds, for example, a predetermined hysteresis margin value (S103).

The SBS may inform candidate HO BSs included in the MOB_MSHO-REQ message of the handover request from the MS through an HO-REQ message (S104).

The candidate HO BSs may take precautions for the MS which requests handover and transmit information associated with handover to the SBS through an HO-RSP message (S105).

The SBS may transmit information associated with handover acquired from the candidate HO BSs through the HO-RSP message to the MS through a handover response (MOB_BSHO-RSP) message. The MOB_BSHO-RSP message may include information for performing handover, such as an action time for performing handover, a handover identifier HO-ID and a dedicated HO CDMA ranging code (S106).

The MS may determine one target BS among the candidate HO BSs based on information included in the MOB_BSHO-RSP message received from the SBS. Then, the MS may transmit a CDMA code to the determined target BS so as to attempt to perform ranging (S107).

The target BS which receives the CDMA code may transmit information as to whether or not ranging succeeds and physical correction values to the MS through a ranging response (RNG-RSP) message (S108).

The MS may transmit a ranging request (RNG-REQ) message for authentication to the target BS (S109).

The target BS which receives the ranging request message of the MS may provide system information available to the BS, such as a connection identifier (CID), to the MS through a ranging response message (S110).

If the target BS successfully completes the authentication of the MS and sends all update information, the target BS may inform the SBS of the MS of information indicating whether or not handover succeeds through a handover completion (HO-CMPT) message (S111).

Thereafter, the MS may exchange information with the target BS which performs handover (S112).

The above-described handover process is performed between the MS and the BS which follow the IEEE 802.16e standard (WirelessMAN-OFDMA R1 Reference System). In the handover procedure defined in the IEEE 802.16m (WirelessMAN-Advanced Air Interface) system, kinds of a medium access control (MAC) management message and the parameters included therein may be partially different. For example, a ranging request/response (RNG-REQ/RSP) message is replaced with an advanced ranging request/response (AAI-RNG-REQ/RSP) message and a handover response (BSHO-RSP) message is replaced with a handover command (AAI-HO-CMD) message.

Hereinafter, in the present specification, for convenience, a system to which a general technology including the IEEE 802.16e standard is applied is referred to as a "legacy system" or a "R1 system". An MS to which the legacy technology is applied is referred to as a "legacy MS" or a "R1 MS". An operation mode of an MS or BS to which the general technology is applied is referred to as a "legacy mode".

An MS to which an advanced technology including the IEEE 802.16m standard (WirelessMAN-OFDMA Advanced Air Interface) is applied is referred to as an "advanced MS". A BS to which the advanced technology is applied is referred to as an "advanced BS (ABS)". An operation mode of an MS or BS to which the advanced technology is applied is referred to as an "advanced mode".

It is assumed that an AMS accesses a legacy BS so as to receive a service from the legacy BS, and an ABS (WirelessMAN-OFDMA R1 Reference System/WirelessMAN-OFDMA Advanced co-existing system) supporting both an AMS and a legacy MS is located adjacent to the legacy BS. Hereinafter, an ABS supporting both the AMS and the legacy MS, that is, the legacy mode and the advanced mode, is referred to as a "mix-mode ABS" and an operation mode of such a BS is referred to as a "mixed mode".

The legacy BS has only a legacy zone (LZone) having a physical channel frame structure applied to a legacy system. It is assumed that an ABS has only an AMS support zone (MZone: 16M zone) having a physical channel frame structure applied to an advanced system if only an AMS is supported (WirelessMAN-OFDMA advanced system only). An ABS (WirelessMAN-OFDMA R1 Reference System/WirelessMAN-OFDMA Advanced co-existing System: legacy supportive) which supports both an AMS and a legacy MS has both a legacy zone and an AMS support zone, which are divided in time units, for example, is divided using time division duplex (TDD) in frame units or subframe units, in uplink and downlink.

It is assumed that the AMS may receive services from both the ABS and the legacy BS. That is, it is assumed that the AMS may receive a service through any one of the AMS support zone and the legacy zone and may perform both a handover procedure defined in the legacy system and a handover procedure defined in the advanced system.

In order to perform handover from a serving legacy BS to an ABS supporting both an AMS and a legacy MS, an AMS may first enter the legacy zone of the ABS and then continuously receive a service in the legacy zone or perform zone switch to the AMS support zone. Alternatively, the AMS may perform handover using a method of performing zone switch to an AMS support zone without entering the legacy zone of the ABS.

Zone switch refers to a procedure of enabling an AMS which has operated in the LZone to operate in the MZone, as the LZone and the MZone which is divided using TDD is present in one carrier. That is, an MS switches a MAC operation defined in the IEEE 802.16e system to a MAC operation defined in the IEEE 802.16m system. In contrast, the AMS may move from the MZone to the LZone.

In order to enable the MS to perform zone switch in the same BS, the MS and the target BS should be aware of some information in advance. For example, the target BS should be aware of whether the MS supports the IEEE 802.16m system in order to schedule a handover or zone switch procedure. The MS should be aware of whether the target BS supports the IEEE 802.16m system and information about a zone to which the MS will move. More specifically, if the MS performs zone switch from the LZone to the MZone, the MS should receive system information (that is, a superframe header (SFH)) of the MZone and be aware of the start location of the MZone in a frame structure.

There are two methods of performing handover defined in the IEEE 802.16e system to the LZone of a mix-mode BS and then performing zone switch to the MZone, that is, a zone switch mode 0 and a zone switch mode 1. In the zone switch mode 0, the MS breaks connection with the LZone at a specific time (e.g., a zone switch action time), performs synchronization with the MZone and receives system information (SFH). The MS which successfully completes the above procedure begins to enter a network of the MZone. At this time, latency occurs due to synchronization and SFH reception time.

In contrast, in the zone switch mode 1, the MS may maintain the operation which has been performed in the LZone and, at the same time, perform synchronization with and network re-entry to the MZone. Accordingly, latency does not occur during zone switch.

The zone switch mode 1 is preferable in terms of latency. However, in terms of implementation of the MS, the MS should perform communication with two zones and thus a large burden is placed upon the MS. In contrast, the zone switch mode 0 is advantageous in terms of implementation of the MS, but significant latency occurs and significantly influences Quality of Service (QoS). This is because the MS should receive the system information of the MZone in order to enter the network of the MZone as described above. Since the MS which will perform zone switch in the zone switch mode 0 is not aware of a start point of a superframe and a frame configuration of the MZone, the MS should perform zone switch while scanning all sections of the MZone from the specific time (e.g., zone switch action time).

DISCLOSURE OF INVENTION

Technical Problem

An object of the present invention devised to solve the problem lies in a more efficient definition of a zone switch procedure.

Another object of the present invention devised to solve the problem lies in a method of reducing latency during zone switch of a mobile station (MS).

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Solution to Problem

The object of the present invention can be achieved by providing a method of performing zone switch by an advanced mobile station (AMS) in a mixed-mode advanced base station (ABS) which operates in a mixed mode of a broadband wireless access system, including receiving a ranging response (RNG-RSP) message including system information of an AMS support zone from a legacy zone (LZone) of the ABS, and performing ranging to the AMS support zone using the system information.

The method may further include transmitting a ranging request (RNG-REQ) message including zone switch capability information indicating a zone switch mode which may be performed by the AMS to the legacy zone.

The ranging request message may further include a change count of a superframe header previously received by the AMS, and the system information may be included in the ranging response message if the change count of the previously received superframe header and the change count of the superframe header broadcast in the AMS support zone differ.

The system information included in the ranging response message may include only subpackets (S-SFH SP IE) corresponding to changed information if the change count of the previously received superframe header and the change count of the superframe header broadcast in the AMS support zone differ.

The system information may be included in the ranging response message, if the zone switch capability information is set to a value indicating that the AMS breaks connection with the legacy zone and performs zone switch to the AMS support zone.

In another aspect of the present invention, provided herein is a method of supporting zone switch of an advanced mobile station (AMS) by a mixed-mode advanced base station (ABS) which operates in a mixed mode in a broadband wireless access system, including receiving a ranging request (RNG-REQ) message including zone switch capability information indicating a zone switch mode which may be performed by the AMS through a legacy zone, and transmitting a ranging response (RNG-RSP) message including system information of an ABS support zone (MZone) to the AMS through the legacy zone (LZone) according to the value of the zone switch capability information.

The ranging request message may further include a change count of a superframe header previously received by the AMS, and the system information may be included in the ranging response message if the change count of the previously received superframe header and the change count of the superframe header broadcast in the AMS support zone differ.

The system information included in the ranging response message may include only subpackets (S-SFH SP IE) corresponding to changed information if the change count of the previously received superframe header and the change count of the superframe header broadcast in the AMS support zone differ.

The system information included in the ranging response message may include only delta information (S-SFH SP IE) corresponding to changed information if the change count of the previously received superframe header and the change count of the superframe header broadcast in the AMS support zone differ.

The system information may be included in the ranging response message, if the zone switch capability information is set to a value indicating that the AMS breaks connection with the legacy zone and performs zone switch to the AMS support zone.

In a further aspect of the present invention, provided herein is an advanced mobile station (AMS) which performs zone switch in a mixed-mode advanced base station (ABS) which operates in a mixed mode of a broadband wireless access system, including a processor, and a radio frequency (RF) module configured to transmit and receive an RF signal to and from an external device under the control of the processor, wherein the processor acquires system information of an AMS support zone (MZone) through a ranging response (RNG-RSP) message received from a legacy zone (LZone) of the ABS and performs ranging to the AMS support zone using the system information.

The processor may control transmission of a ranging request (RNG-REQ) message including zone switch capability information indicating a zone switch mode which may be performed by the AMS to the legacy zone.

The ranging request message may further include a change count of a superframe header previously received by the AMS, and the system information may be included in the ranging response message if the change count of the previously received superframe header and the change count of the superframe header broadcast in the AMS support zone differ.

The system information included in the ranging response message may include only subpackets (S-SFH SP IE) corresponding to changed information if the change count of the previously received superframe header and the change count of the superframe header broadcast in the AMS support zone differ.

The system information may be included in the ranging response message, if the zone switch capability information is set to a value indicating that the AMS breaks connection with the legacy zone and performs zone switch to the AMS support zone.

Advantageous Effects of Invention

According to the embodiments of the present invention, the following effects are obtained.

First, by using the embodiments of the present invention, a mobile station (MS) can efficiently perform zone switch.

Second, according to the embodiments of the present invention, an MS can receive system information of a zone to be switched to in advance so as to reduce latency.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

In order to solve the above technical problems, the present invention discloses a preferred context mapping method when an advanced mobile station (AMS) performs zone switch.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the mobile terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB) or access point as necessary. The term "terminal" may also be replaced with the terms user equipment (UE), mobile station (MS), mobile subscriber station (MSS) or subscriber station (SS) as necessary.

The embodiments of the present invention may be implemented by various parts. For example, the embodiments of the present invention may be implemented by hardware, firmware, software or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. For example, the software code may be stored in the memories so that it can be driven by the processors. The memory units are located inside or outside the processors, so that they can communicate with the aforementioned processors via a variety of well-known parts.

The embodiments of the present invention can be supported by the standard documents disclosed in any one of wireless access systems, such as an IEEE802 system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents. In addition, all the terms disclosed in the present document may be described by the above standard documents. In particular, the embodiments of the present invention may be supported by at least one of P802.16-2004, P802.16e-2005 and P802.16Rev2 documents, which are the standard documents of the IEEE802.16 system.

It should be noted that specific terms disclosed in the present invention are proposed for the convenience of description and better understanding of the present invention, and the use of these specific terms may be changed to another format within the technical scope or spirit of the present invention.

Hereinafter, an efficient zone switch method according to the present invention will be described. More particularly, the embodiments of the present invention are more efficient when a zone switch mode 0 for breaking connection with a previously connected zone during zone switch is performed, that is, are more efficient when an MS may not perform SFH decoding of an MZone while operating in an LZone.

As described above, generally, when an MS performs zone switch from an LZone to an MZone, the MS breaks connection with the LZone at a specific time (e.g., a zone switch action time), performs synchronization with the MZone, and receives system information (that is, an SFH), in the zone switch mode 0. At this time, latency occurs until the MS completes the reception of the SFH of the MZone. In order to solve such a problem, in one embodiment of the present invention, a base station (BS) transmits information included in the SFH of the MZone to the MS in advance through the LZone.

More specifically, the system information of the MZone may be included in a medium access control (MAC) management message transmitted from the BS to the MS through the LZone in a zone switch procedure. Examples of the MAC management message may include a ranging response (RNG-RSP) message including zone switch Type Length Value (TLV) (ZS TLV) information.

In general, the ZS TLV may include information shown in Table 1.

TABLE 1

| Name | Type (1 byte) | Length | Value |
|---|---|---|---|
| MZone A-Preamble index | 41 | 2 | |
| Time offset | 42 | 1 | Time offset between LZone and MZone |
| Zone Switch Mode | 44 | 1 | 0x01: AMS maintains its data communication with the ABS in LZone while performing network reentry in MZone; 0x00: AMS breaks data communication in LZone before performing network reentry in MZone. |
| Temporary STID | 46 | 1 | Temporary STID for being used in MZone |
| Ranging initiation deadline | 47 | 1 | Valid time for Temporary STID. Shall be included if Temporary STID is included. |

Referring to Table 1, the ZS TLV may include information about a preamble index (MZone A-preamble index) used in the MZone, time offset information indicating a division boundary (or ratio) of the LZone and the MZone in a TDD frame structure, zone switch mode information indicating whether the MS maintains connection with the LZone in a zone switch procedure, temporary station identifier (STID) information for temporarily identifying the MS in the MZone and ranging initiation deadline information indicating a valid time of the temporary STID.

If information included in the superframe header of the MZone is further included in a ranging response message in addition to the ZS TLV, the information may have a format shown in Table 2 in the RNG-RSP message.

Table 2 shows an example of system information of the MZone included in the ranging response message according to an embodiment of the present invention.

TABLE 2

| Name | Type (1 byte) | Length | Value |
|---|---|---|---|
| TLV encoded information of ABS MZone's SFH | 51 | 33 | Data encoding of SFH SP1/SP2/SP3. It maybe sent in case AMS is not capable of SFH decoding in MZone while operating in LZone. |

Referring to Table 2, the ranging response message transmitted from the LZone to the MS may include information included in the SFH of the MZone in a TLV (type, length, value) encoding format. TLV encoding including the system information (SFH) of the MZone shown in Table 2 is shown in Table 3 in greater detail.

TABLE 3

| Name | Type (1 byte) | Length | Value |
|---|---|---|---|
| SFH Subpkt 1 | 51 | Variable depending on FFT size | Full subpacket information of Sub-packet 1 provided |
| SFH Subpkt 2 | | Variable depending on FFT size | Full subpacket information of Sub-packet 2 provided |
| SFH Subpkt 3 | | Variable | Full subpacket information of Sub-packet 3 provided |

An example of a zone switch procedure using a ranging response message having the above structure will be described with reference to FIG. 2.

Figure 2:
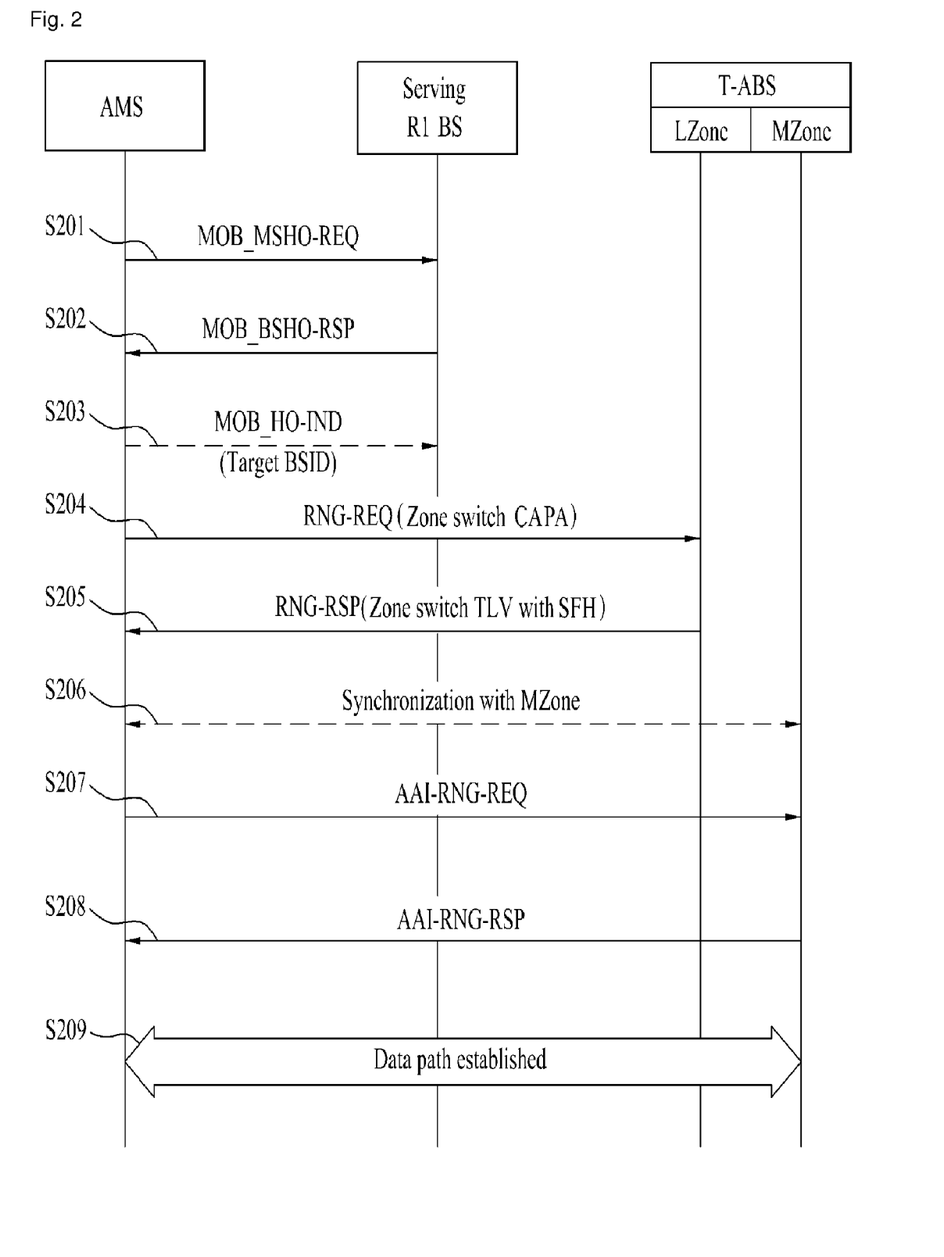
FIG. 2 is a diagram showing an example of a handover procedure through zone switch according to an embodiment of the present invention.

FIG. 2 is a diagram showing an example of a handover procedure through zone switch according to an embodiment of the present invention.

Referring to FIG. 2, a terminal (AMS) may begin to scan candidate HO BSs using a handover trigger condition while communicating with a legacy serving BS. The AMS may transmit a handover request (MOB_MSHO-REQ) message and request a handover procedure from the serving BS, if a handover condition exceeds, for example, a predetermined hysteresis margin value (S201).

The serving BS may transmit information associated with handover acquired from the candidate HO BSs to the AMS through a handover response (MOB_BSHO-RSP) message. The MOB_BSHO-RSP message may include information for performing handover, such as a handover action time, a handover identifier (HO-ID) and a dedicated HO CDMA ranging code (S202).

The AMS may determine a legacy ABS as a target BS among the candidate HO BSs based on the information included in the MOB_BSHO-RSP message received from the serving BS. Then, the AMS may transmit a handover indication message to the serving legacy BS (S203).

Thereafter, the AMS transmits a ranging request (RNG-REQ) message to the LZone of the target BS (S204).

At this time, the ranging request message may include MAC version information of the AMS, the value of which is set to a value corresponding to the AMS. The ranging request message may include a zone switch capability field indicating the format of zone switch which may be performed by the AMS. The zone switch capability field may have the format shown in Table 4.

TABLE 4

| Name | Type (1 byte) | Length | Value |
|---|---|---|---|
| Zone Switch Capability | 1 | 1 | Informs the supported capability for Zone Switch. Bit 0: Indicates that AMS is able to perform Zone Switch mode 0. Bit 1: Indicates that AMS is able to perform Zone Switch mode 1. Bit 2-7: reserved |

The target BS may recognize that an MS which transmits a ranging request message is an AMS, using information acquired from a previous serving legacy BS or MAC version information included in the ranging request message, and perform zone switch to the MZone. The BS may recognize a zone switch mode which may be performed by the AMS using the zone switch capability information. At this time, the AMS sets the zone switch capability field of the ranging request message to a value indicating the zone switch mode 0.

The target BS transmits a ranging response (RNG-RSP) message including zone switch information (ZS TLV) to the AMS through the LZone, for zone switch. At this time, since the AMS supports the zone switch mode 0, the ranging response message includes the system information of the MZone.

Since the AMS acquires the system information of the MZone through the ranging response message in advance, the AMS performs synchronization with the MZone of the target BS without receiving the SFH of the MZone (S206) and requests uplink resources for transmitting a ranging request (AAI_RNG-REQ) message (BR request for AAI_RNG-REQ) in order to perform zone switch.

If the MZone allocates the requested uplink resources, the AMS transmits a ranging request (AAI_RNG-REQ) message to the MZone (S207). At this time, the value of a ranging purpose indication field of the ranging request message is set to a value (e.g., Ob1010) indicating zone switch from the LZone to the MZone.

The target ABS transmits a ranging response (AAI_RNG-RSP) message to the AMS in response to the ranging request message transmitted from the AMS (S208).

Thereafter, the AMS may complete zone switch to the MZone and perform normal communication with the target ABS through the MZone (S209).

Although, in the method described above with reference to FIG. 2, the AMS performs zone switch to the MZone in a state in which network re-entry to the LZone of the target BS is not completed, the AMS may complete network re-entry to the LZone and then perform zone switch to the MZone, which will be described with reference to FIG. 3.

Figure 3:
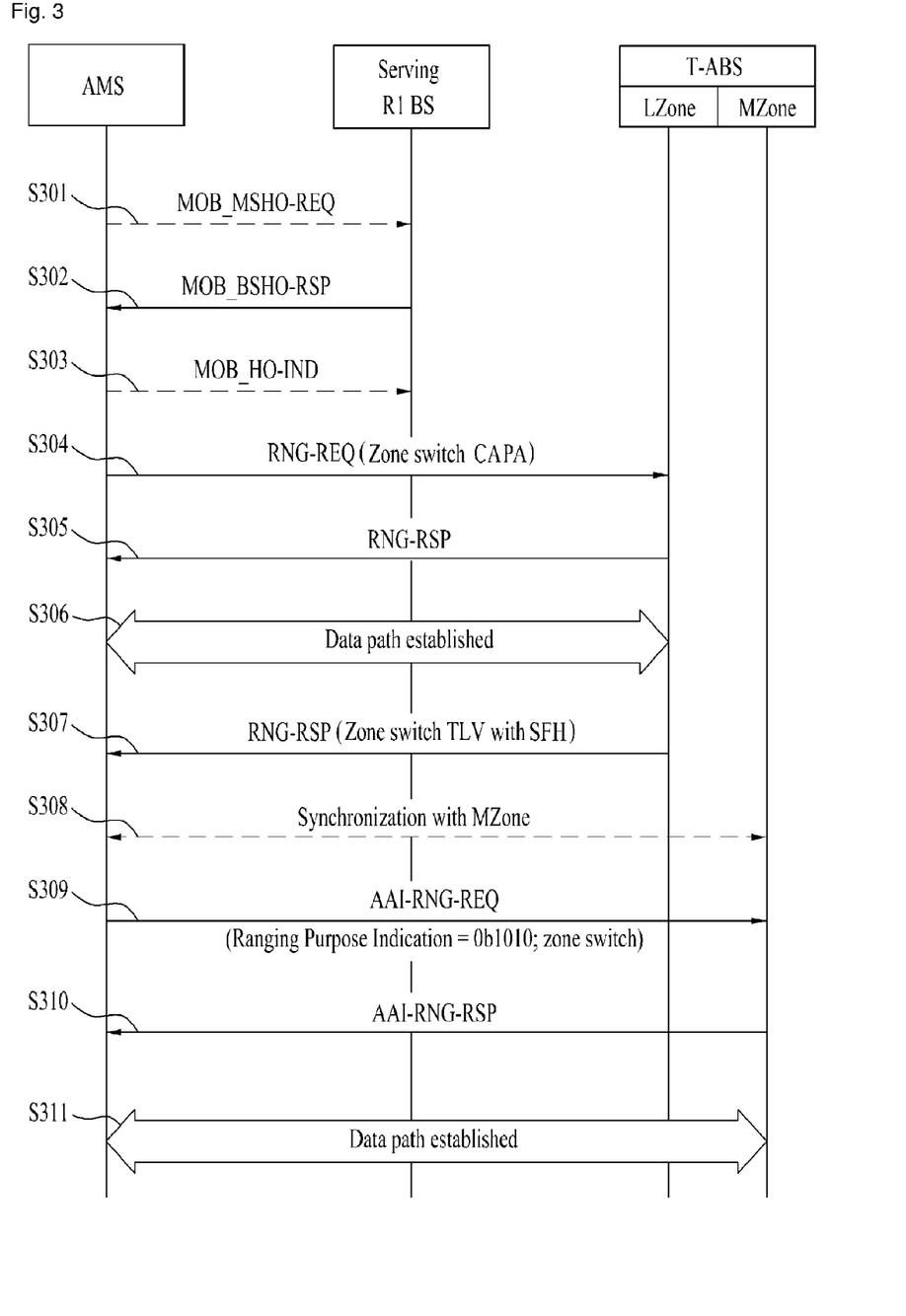
FIG. 3 is a diagram showing another example of a handover procedure through zone switch according to an embodiment of the present invention.

FIG. 3 is a diagram showing another example of a handover procedure through zone switch according to an embodiment of the present invention.

Steps S301 to S304 of FIG. 3 are similar to steps S201 to S204 of FIG. 2 and thus a description thereof will be omitted for clarity of the specification.

The target BS which receives the RNG-REQ message in which the zone switch capability field is set to the value indicating the zone switch mode 0 from the AMS may recognize that the MS which transmits the ranging request message is an AMS, using the information included in the ranging request message, and perform zone switch to the MZone. The target BS may defer zone switch of the AMS due to load balancing between the LZone and the MZone.

Then, the target BS may transmit a ranging response (RNG-RSP) message which does not include the system information of the MZone or ZS TLV to the AMS (S305), and the AMS may complete network re-entry to the LZone of the target BS and perform normal communication (S306).

Thereafter, upon determining that the target BS has instructed the AMS to perform zone switch to the MZone, the ranging response (RNG-RSP) message including the system information and the ZL TLV may be unsolicitedly transmitted to the AMS (S307).

Since the AMS acquires the system information of the MZone through the ranging response message in advance, the AMS performs synchronization with the MZone of the target BS without receiving the SFH of the MZone (S308) and requests uplink requests for transmitting a ranging request (AAI_RNG-REQ) message (BR request for AAI_RNG-REQ) in order to perform zone switch (not shown).

If the MZone allocates the requested uplink resources, the AMS transmits a ranging request (AAI_RNG-REQ) message to the MZone (S309). At this time, the value of a ranging purpose indication field of the ranging request message is set to a value (e.g., 0b1010) indicating zone switch from the LZone to the MZone.

The target ABS transmits a ranging response (AAI_RNG-RSP) message to the AMS in response to the ranging request message transmitted from the AMS (S310).

Thereafter, the AMS may complete zone switch to the MZone and perform normal communication with the target ABS through the MZone (S311).

In another example of the present embodiment, the system information of the MZone transmitted from the LZone of the target BS may be partially transmitted as necessary.

More specifically, the SFH which is the system information of the MZone may be divided into P-SFH and S-SFH. The S-SFH may be divided into three subpackets (S-SFH SP IE 1/2/3). The P-SFH includes control information for decoding the S-SFH and substantial system information is included in each subpacket. Each subpacket is transmitted with a predetermined period and such subpackets may be independently updated. Accordingly, if the AMS has received the SFH of the MZone of the target BS in advance, only some packets of the previously received SFH are changed when performing zone switch from the LZone to the MZone again and only the changed packets are received, it is possible to reduce signaling overhead. A determination as to whether the SFH is changed may be determined according to an identity of the SFH change count included in the SFH.

According to another example of the present invention, when the AMS transmits the ranging request message to the LZone of the target BS, the AMS transmits the SFH change count of the SFH and the BS includes only subpackets differing from those of the SFH of the AMS in the ranging response message.

The format of the SFH change count included in the ranging request message is shown in Table 5.

TABLE 5

| Name | Type (1 byte) | Length | Value |
| --- | --- | --- | --- |
| Zone Switch Capability | 1 | 1 | Informs the supported capability for Zone Switch. Bit 0: Indicates that AMS is able to perform ZoneSwitch mode 0. Bit 1: Indicates that AMS is able to perform Zone Switch mode 1. Bit 2-7: reserved |

TABLE 5-continued

| Name | Type (1 byte) | Length | Value |
| --- | --- | --- | --- |
| S-SFH change count | 2 | 1 | S-SFH change count of the reference for the included SFH delta information. Shall be included when SFH delta information is included |

As shown in Table 5, in the case where the SFH change count is included in the ranging request message, the BS may compare the SFH change count included in the ranging request message with the current SFH change count of the MZone and may not include the system information of the MZone in the ranging response message if the SFH change count included in the ranging request message is identical to the current SFH change count of the MZone. If the SFH change count included in the ranging request message differs from the current SFH change count of the MZone, the BS may include full or partial subpacket information of the difference between the SFH corresponding to the SFH count of the AMS and the SFH corresponding to the current SFH change count of the MZone in the ranging response message. The partial packet may refer only to different (changed) information (that is, delta information) among the subpackets.

An example of the full or partial subpacket information of the MZone SFH included in the ranging response message is shown in FIG. 6.

TABLE 6

| Name | Type (1 byte) | Length | Value |
| --- | --- | --- | --- |
| SFH Subpkt 1 | 51 | Variable depending on FFT size and elements of SP1 included | Full or partial subpacket information of subpacket 1 provided |
| SFH Subpkt 2 | 49 | Variable depending on FFT size and elements of SP2 included | Full or partial subpacket information of subpacket 2 provided |
| SFH Subpkt 3 | 50 | Variable depending on number elements of SP3 included | Full or partial subpacket information of subpacket 3 provided |

Referring to Table 6, the AMS may include full or partial subpacket information of the superframe header in the ranging response message according to the difference between the SFH change count transmitted through the ranging request message and the current SFH change count of the MZone.

As shown in Table 1, a preamble index of the MZone may be included in the ZS TLV, in order to reduce a process of recognizing the preamble of the MZone when the AMS performs zone switch to the MZone. In addition, in order to promote MZone network re-entry of the AMS, in another example of the present embodiment, SFH start offset information indicating a time when an SFH header is transmitted is further included in the ZS TLV. In this case, since it is possible to be aware of the time when the SFH header is transmitted even when the system information (SFH) of the MZone is not received through the ranging response message, it is possible to efficiently determine the time when network re-entry is started. Accordingly, it is possible to reduce latency consumed for network reentry of the AMS in the MZone.

Although the zone switch mode 0 is described in the above embodiments, the present invention is not limited thereto and is also applicable to the zone switch mode 1. That is, even in the zone switch mode 1, the AMS may receive the SFH of the MZone through the RNG-RSP message in the LZone in advance and rapidly perform network re-entry to the MZone.

AMS and BS Structure

Hereinafter, an AMS and a BS (FBS, MBS) in which the embodiments of the present invention may be performed will be described as another embodiment of the present invention.

The AMS operates as a transmitter in uplink and operates as a receiver in downlink. The BS may operate as a receiver in uplink and operate as a transmitter in downlink. That is, each of the MS and the BS may include a transmitter and a receiver for transmission of information or data.

The transmitter and the receiver may include a processor, a module, a portion and/or means for performing the embodiments of the present invention. In particular, each of the transmitter and the receiver may include a module (means) for encrypting a message, a module for decrypting an encrypted message, and an antenna for transmitting or receiving a message. An example of the transmitter and the receiver will be described with reference to FIG. 4.

Figure 4:
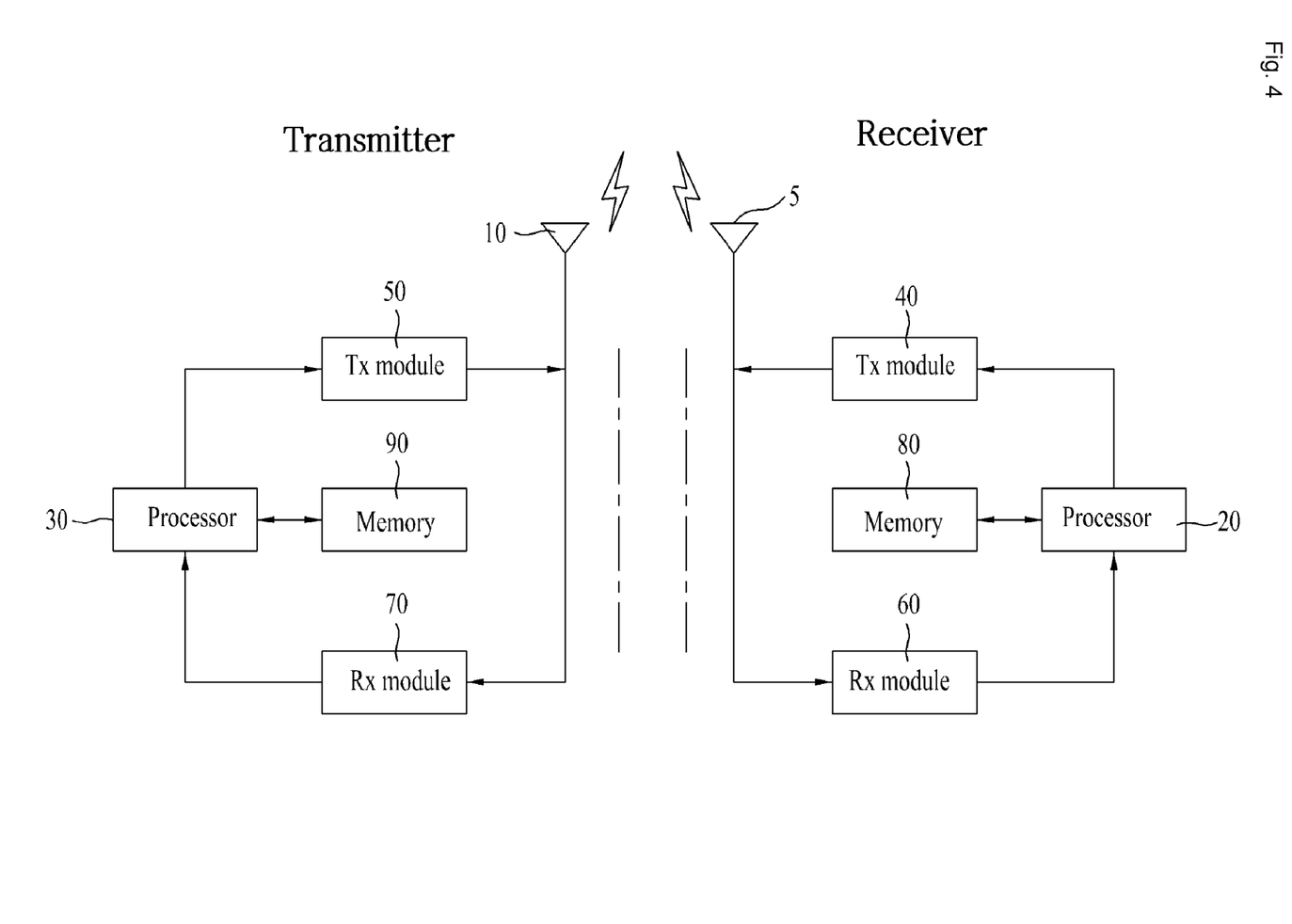
FIG. 4 is a block diagram showing an example of the structure of a transmitter and a receiver according to another embodiment of the present invention.

FIG. 4 is a block diagram showing an example of the structure of a transmitter and a receiver according to another embodiment of the present invention.

Referring to FIG. 4, a left side shows the structure of the transmitter and a right side shows the structure of the receiver. The transmitter and the receiver may include antennas 5 and 10, processors 20 and 30, transmission (Tx) modules 40 and 50, reception (Rx) modules 60 and 70, and memories 80 and 90, respectively. These components may perform corresponding functions. Hereinafter, the components will be described in more detail.

The antennas 5 and 10 serve to transmit signals generated by the Tx modules 40 and 50 and receive external radio frequency (RF) signals to the Rx modules 60 and 70. The number of antennas may be two or more if a Multi-Input Multi-Output (MIMO) function is supported.

The antenna, the Tx module and the Rx module may configure a radio frequency (RF) module.

The processors 20 and 30 generally control the overall operations of the MS. In particular, a controller function for performing the above-described embodiments of the present invention, a MAC frame variable control function according to service characteristics and transmission environment, a handover function and an authentication and encryption function may be performed. More specifically, the processors 20 and 30 may perform an overall control operation for performing handover through zone switch shown in FIGS. 2 and 3.

More particularly, the processor of the AMS may inform the BS of a zone switch mode which may be performed by the AMS upon network (re)entry to the LZone of the mixed-mode BS and acquire the system information of the MZone through a ranging response message received through the LZone in advance. Accordingly, the processor of the AMS may more rapidly perform network re-entry to the MZone.

The processor of the AMS may perform an overall control operation of the above-described procedures of the embodiments.

The Tx modules 40 and 50 may be scheduled by the processors 20 and 30 so as to perform predetermined coding and modulation with respect to data to be transmitted and to send the data to the antennas 5 and 10.

The Rx modules 60 and 70 may perform decoding and demodulation of the RF signals received through the antennas 5 and 10 and restore and send original data to the processors 20 and 30.

The memories 80 and 90 may store programs for processing and controlling the processors 20 and 30 and perform a function for temporarily storing input/output data (in the case of the MS, uplink (UL) grant allocated by the BS, system information, STID, FID, capability information, etc.). In addition, the memories 80 and 90 may include at least one of storage mediums such as a flash memory type, hard disk type, multimedia card micro type and card type memory (e.g., an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disc.

Meanwhile, the BS may perform a controller function for performing the above-described embodiments of the present invention, Orthogonal Frequency Division Multiple Access (OFDMA) packet scheduling, Time Division Duplex (TDD) packet scheduling and a channel multiplexing function, a MAC frame variable control function according to service characteristics and transmission environment, a high-speed traffic real-time control function, a handover function, an authentication and encryption function, a packet modulation/demodulation function for data transmission, a high-speed packet channel coding function and a real-time modem control function using at least one of the above-described modules, or further include separate means, modules or portions for performing such functions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Moreover, it will be apparent that some claims referring to specific claims may be combined with another claims referring to the other claims other than the specific claims to constitute the embodiment or add new claims by means of amendment after the application is filed.

MODE FOR THE INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention are applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

The invention claimed is:
1. A method of performing a zone switch by an advanced mobile station (AMS) in a wireless communication system, the method comprising:
receiving, by the AMS from a legacy zone (LZone) of an advanced base station (ABS), a ranging response (RNG-RSP) message including zone switch Type Length Value

(TLV) parameters and a plurality of secondary-superframe header subpackets(S-SFH SPs) of an AMS support zone; and performing, by the AMS, ranging to the AMS support zone using the plurality of S-SFH SPs, wherein the zone switch TLV parameters includes a preamble index of the AMS support zone and an offset between the LZone and the AMS support Zone, wherein the plurality of S-SFH SPs includes a first S-SFH SP, a second S-SFH SP and a third S-SFH SP, and wherein the first S-SFH SP, the second S-SFH SP and the third S-SFH SP are periodically broadcasted in the AMS support zone in accordance with predetermined periods, and the AMS obtains the first S-SFH SP, the second S-SFH SP and the third S-SFH SP at once from the LZone by receiving the ranging response message before being synchronized with the AMS support zone.

2. The method according to claim 1, further comprising: transmitting, by the AMS to the LZone, a ranging request (RNG-REQ) message including zone switch capability information indicating a zone switch mode which can be performed by the AMS.

3. The method according to claim 2, wherein the plurality of the S-SFH SPs are included in the ranging response message, if the zone switch capability information is set to a value indicating a mode in which the AMS breaks connection with the LZone and performs the zone switch to the AMS support zone.

4. A method by an advanced base station (ABS) of supporting a zone switch of an advanced mobile station (AMS) in a wireless communication system, the method comprising:

receiving, by the ABS, a ranging request (RNG-REQ) message including zone switch capability information indicating a zone switch mode which can be performed by the AMS through a legacy zone (LZone); and transmitting, by the ABS to the AMS through the LZone according to the value of the zone switch capability information, a ranging response (RNG-RSP) message including zone switch Type Length Value (TLV) parameters and a plurality of secondary-superframe header subpackets (S-SFH SPs) of an AMS support zone, wherein the zone switch TLV parameters includes a preamble index of the AMS support zone and an offset between the LZone and the AMS support Zone, wherein the plurality of S-SFH SP s includes a first S-SFH SP, a second S-SFH SP and a third S-SFH SP, and wherein the first S-SFH SP, the second S-SFH SP and the third S-SFH SP are periodically broadcasted in the AMS support zone in accordance with predetermined periods, and the AMS obtains the first S-SFH SP, the second S-SFH SP and the third S-SFH SP at once from the LZone by receiving the ranging response message before being synchronized with the AMS support zone.

5. The method according to claim 4, wherein the plurality of S-SFH SPs are included in the ranging response message, if the zone switch capability information is set to a value indicating a mode in which the AMS breaks connection with the LZone and performs the zone switch to the AMS support zone.

6. An advanced mobile station (AMS) which performs a zone switch in a wireless communication system, the AMS comprising:

a processor; and a radio frequency (RF) module configured to transmit and receive an RF signal under the control of the processor to and from an advanced base station (ABS)

wherein the RF module receives a ranging response (RNG-RSP) message including zone switch Type Length Value (TLV) parameters and a plurality of secondary-superframe header subpackets (S-SFH SPs) of an AMS support zone from a legacy zone (LZone) of the ABS, wherein the processor performs ranging to the AMS support zone using the plurality of S-SFH SPs, wherein the zone switch TLV parameters includes a preamble index of the AMS support zone and an offset between the LZone and the AMS support Zone, wherein the plurality of S-SFH SPs includes a first S-SFH SP, a second S-SFH SP and a third SFH SP, and wherein the first S-SFH SP, the second S-SFH SP and the third S-SFH SP are periodically broadcasted in the support zone in accordance with predetermined periods, and the AMS obtains the first S-SFH SP, the second S-SFH SP and the third S-SFH SP at once from the LZone by receiving the ranging response message before being synchronized with the AMS support zone.

7. The AMS according to claim 6, wherein the processor controls transmission to the LZone of a ranging request (RNG-REQ) message including zone switch capability information indicating a zone switch mode which can be performed by the AMS.

8. The AMS according to claim 7, wherein the plurality of S-SFH SPs are included in the ranging response message, if the zone switch capability information is set to a value indicating a mode in which the AMS breaks connection with the Lzone and performs zone switch to the AMS support zone.

* * * * *